US012583251B2

(12) United States Patent
Halawani et al.

(10) Patent No.: US 12,583,251 B2
(45) Date of Patent: Mar. 24, 2026

(54) WHEELS WITH CONTROLLABLE SUCTION DEVICES FOR ADHESION ON SURFACES

(71) Applicant: SAUDI ARABIAN OIL COMPANY, Dhahran (SA)

(72) Inventors: Abdulwahab Halawani, Thuwal (SA); Sahejad Patel, Thuwal (SA); Fadl Abdellatif, Thuwal (SA); Mohammed H. Alsheikh, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 435 days.

(21) Appl. No.: 18/191,963

(22) Filed: Mar. 29, 2023

(65) Prior Publication Data

US 2024/0326511 A1 Oct. 3, 2024

(51) Int. Cl.
*B60B 15/26* (2006.01)
(52) U.S. Cl.
CPC .................................. *B60B 15/266* (2013.01)
(58) Field of Classification Search
CPC ..................................................... B60B 15/266
See application file for complete search history.

(56) References Cited

U.S. PATENT DOCUMENTS

| | | | | |
|---|---|---|---|---|
| 4,667,719 | A | * 5/1987 | Masuda | ................ B60C 11/032 152/209.17 |
| 6,099,091 | A | * 8/2000 | Campbell | ............. E04H 4/1654 180/164 |
| 6,633,150 | B1 | 10/2003 | Wallach et al. | |
| 2004/0020170 | A1 | 2/2004 | LaRocca | |
| 2008/0202602 | A1 | 8/2008 | Flaim et al. | |
| 2014/0216836 | A1 | 8/2014 | Davies et al. | |
| 2017/0164797 | A1 | 6/2017 | Abramson et al. | |
| 2020/0156237 | A1 | 5/2020 | Tang et al. | |

* cited by examiner

*Primary Examiner* — Jason R Bellinger
(74) *Attorney, Agent, or Firm* — Leason Ellis LLP

(57) ABSTRACT

Wheels have controllable suction devices for adhesion on surfaces. The wheel has an axle and an outer circumferential surface. The outer circumferential surface has a plurality of apertures and a plurality of stretchable materials. Each aperture has a respective stretchable material therein. Rotating the wheel moves a first stretchable material adjacent to a surface of a structure. A portion of the first stretchable material moves in the direction radial to the axle, to control adhesion of a portion of the outer circumferential surface to the surface of the structure. A method implements use of the wheel to adhere to the surface of the structure.

13 Claims, 12 Drawing Sheets

WHEELS WITH CONTROLLABLE SUCTION DEVICES FOR ADHESION ON SURFACES

FIELD OF THE DISCLOSURE

The present disclosure relates generally to wheels with adhesion on surfaces, and, more particularly, to wheels with controllable suction devices for adhesion on surfaces.

BACKGROUND OF THE DISCLOSURE

In crawling systems, such as a crawler or an unmanned aerial vehicle (UAV) used to inspect structures, including oil and gas pipelines, the crawling systems can be employed to move over a surface of the structures. Since a pipeline or other structures can have curved surfaces or surfaces extending vertically, the crawling systems need to move adjacent to such surfaces in any orientation. In some crawling systems, wheels are employed.

In order to move adjacent to surfaces in any orientation, the crawling systems need to adhere to the surfaces. When the surface is metallic, the crawling systems can use magnetic or electromagnetic adhesion mechanisms to adhere to such metallic surfaces. However, magnetic or electromagnetic adhesion mechanisms are ineffective when the surface of a structure is not made of a ferromagnetic metal.

SUMMARY OF THE DISCLOSURE

According to an embodiment consistent with the present disclosure, wheels have controllable suction devices for adhesion on surfaces.

In an embodiment, a wheel comprising an axle, an outer circumferential surface, a bracket, a diaphragm, and a diaphragm moving device. The outer circumferential surface has a plurality of apertures and a plurality of stretchable materials, wherein each aperture has a respective stretchable material therein, wherein a portion of the outer circumferential surface is adjacent to a surface of a structure. The bracket couples the outer circumferential surface to the axle. A portion of the diaphragm is adjacent to the portion of the outer circumferential surface. The diaphragm moving device is configured to move the portion of the diaphragm in a direction radial to the axle. A first aperture of the plurality of apertures and a respective first stretchable material of the plurality of stretchable materials are adjacent to the surface of the structure. The moved portion of the diaphragm moves a portion of the first stretchable material in the direction radial to the axle, thereby controlling adhesion of the portion of the outer circumferential surface to the surface of the structure.

Movement of the portion of the first stretchable material radially towards the axle increases adhesion of the portion of the outer circumferential surface to the surface of the structure. Movement of the portion of the first stretchable material radially away from the axle decreases adhesion of the portion of the outer circumferential surface to the surface of the structure. The diaphragm moving device can be a linear actuator. The linear actuator has a rod coupled to the portion of the diaphragm, and the rod moves in the direction radial to the axle to move the portion of the diaphragm in the direction radial to the axle. The wheel further comprises a motor driving gear configured to rotate or to not rotate the outer circumferential surface, wherein the linear actuator is coupled to the motor driving gear by a gear assembly, and wherein gear assembly moves the rod in the direction radial to the axle to move the portion of the diaphragm in the direction radial to the axle.

In an alternative embodiment, the diaphragm moving device can be a pump. The pump has a tube coupled to the portion of the diaphragm, wherein the pump moves a substance in the direction radial to the axle to move the portion of the diaphragm in the direction radial to the axle, and the substance is a gas or a liquid. The wheel further comprises a motor driving gear configured to rotate or to not rotate the outer circumferential surface, wherein the pump is coupled to the motor driving gear by a gear assembly, and wherein gear assembly controls the pump to move the substance in the direction radial to the axle to move the portion of the diaphragm in the direction radial to the axle. The surface of the structure can be composed of a non-ferromagnetic metallic material. Alternatively, the surface of the structure can be composed of a metallic material.

In another embodiment, a wheel comprises an axle, an outer circumferential surface, an inner sleeve, a bracket, a plurality of springs, and a plurality of bars. The outer circumferential surface has a plurality of slots, a plurality of activator switches, a plurality of apertures and a plurality of stretchable materials, wherein each activator switch extends through a respective slot, wherein each aperture has a respective stretchable material therein, wherein a portion of the outer circumferential surface is adjacent to a surface of a structure. The bracket couples the outer circumferential surface and the inner sleeve to the axle. The plurality of springs are coupled to the inner sleeve, wherein each spring extends in a direction radial to the axle. The plurality of bars are each coupled to a respective spring, and each coupled to a stretchable material. A first aperture of the plurality of apertures and a respective first stretchable material of the plurality of stretchable materials are adjacent to the surface of the structure, and rotation of the outer circumferential surface causes a first activator switch to be disposed adjacent to the surface of the structure, to control the first activator switch to move into or out of a first respective slot, to move a respective first bar in a direction radial to the axle, and to move a portion of the first stretchable material in the direction radial to the axle, thereby controlling adhesion of the portion of the outer circumferential surface to the surface of the structure.

Movement of the portion of the first stretchable material radially towards the axle increases adhesion of the portion of the outer circumferential surface to the surface of the structure. Movement of the portion of the first stretchable material radially away from the axle decreases adhesion of the portion of the outer circumferential surface to the surface of the structure. The wheel further comprises a latch member, and the activator switch includes a first arm and a second arm. The first arm is configured to engage the surface of the structure, and the second arm is configured to engage the latch member. The first and second arms are coupled at a pivot point. Engagement of the first arm with the surface of the structure pivots the activator switch to move an end of the second arm away from the latch member, to move the respective first bar associated with the activator switch radially towards the axle, to move the portion of the first stretchable material radially towards the axle, thereby increasing adhesion of the portion of the outer circumferential surface to the surface of the structure.

Disengagement of the first arm from the surface of the structure pivots the activator switch to move the end of the second arm to engage the latch member, to move the respective first bar associated with the activator switch away from the axle, and to move the portion of the first stretchable material radially away from the axle, thereby decreasing adhesion of the portion of the outer circumferential surface to the surface of the structure. The wheel further comprises a first wedge having a first inclined surface configured to slidably engage the first bar, wherein rotation of the outer circumferential surface in a first rotational direction causes the first bar to slide along the first inclined surface to move radially towards the axle, thereby to decrease a tension of a respective first spring associated with the first bar, wherein the decreased tension of the first spring cause the portion of the first stretchable material to move radially towards the axle, thereby increasing adhesion of the portion of the outer circumferential surface to the surface of the structure. The wheel further comprises a second wedge having a second inclined surface configured to slidably engage the first bar, wherein rotation of the outer circumferential surface in a first rotational direction causes the first bar to slide along the second inclined surface to move radially away from the axle, thereby to increasing the tension of the respective first spring associated with the first bar, wherein the increased tension of the first spring causes the portion of the first stretchable material to move radially away from the axle, thereby decreasing adhesion of the portion of the outer circumferential surface to the surface of the structure.

In a further embodiment, a method comprises providing a wheel with an axle and an outer circumferential surface having a plurality of apertures and a plurality of stretchable materials wherein each aperture has a respective stretchable material therein, rotating the wheel to move a first stretchable material adjacent to a surface of a structure, and moving a portion of the first stretchable material in the direction radial to the axle, thereby controlling adhesion of a portion of the outer circumferential surface to the surface of the structure. The surface of the structure is a non-ferromagnetic metal material.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

Figure 1:
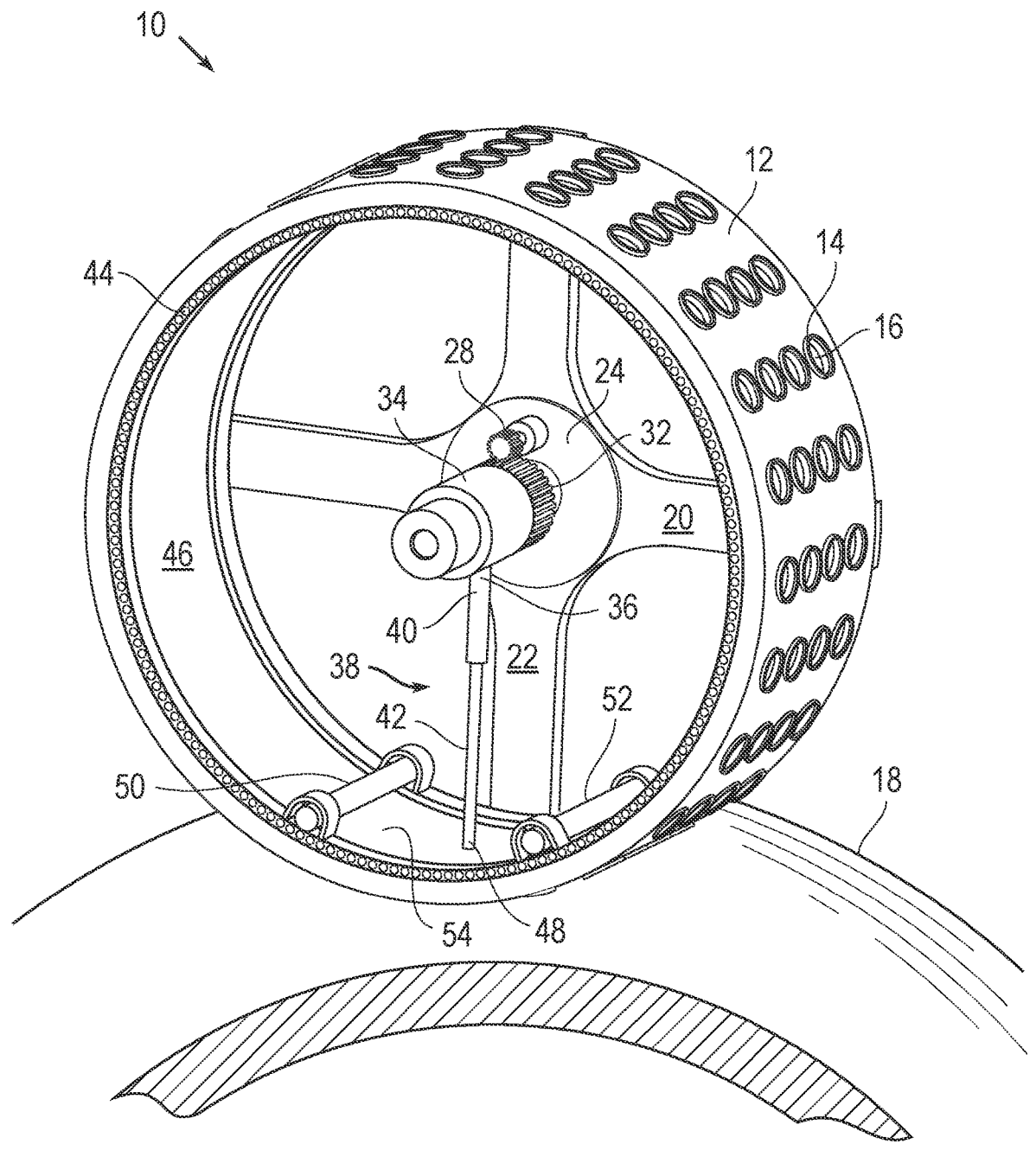
FIG. 1 is a top front side perspective view of a wheel, according to an embodiment.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to wheels with controllable suction devices for adhesion on surfaces.

In a first embodiment shown in FIGS. 1-4, a wheel 10 has an outer ring 12 with a plurality of apertures 14 in which are disposed a stretchable material 16. The stretchable material 16 can be composed of natural rubber. Alternatively, the stretchable material 16 can be composed of synthetic rubber. In a further alternative embodiment, the stretchable material 16 can be composed of any known resilient material which can deform in response to suction of gases such as air, or liquids. Such a resilient material can return to a non-deformed state in response to removal of the suction effect of the gases. Accordingly, in response to control of the suction of the gases, the stretchable material 16 acts as a suction cup to create a vacuum between the suction cup and a surface 18. Thus, the deformed stretchable material 16 can have an adhesion effect between the wheel 10 and a portion of a surface 18 adjacent to the deformed stretchable material 16. The surface 18 can be a non-metallic surface of a structure, and so the wheel 10 does not require magnetic attraction to adhere to the surface 18. Alternatively, the surface 18 can be a metallic surface.

Figure 2:
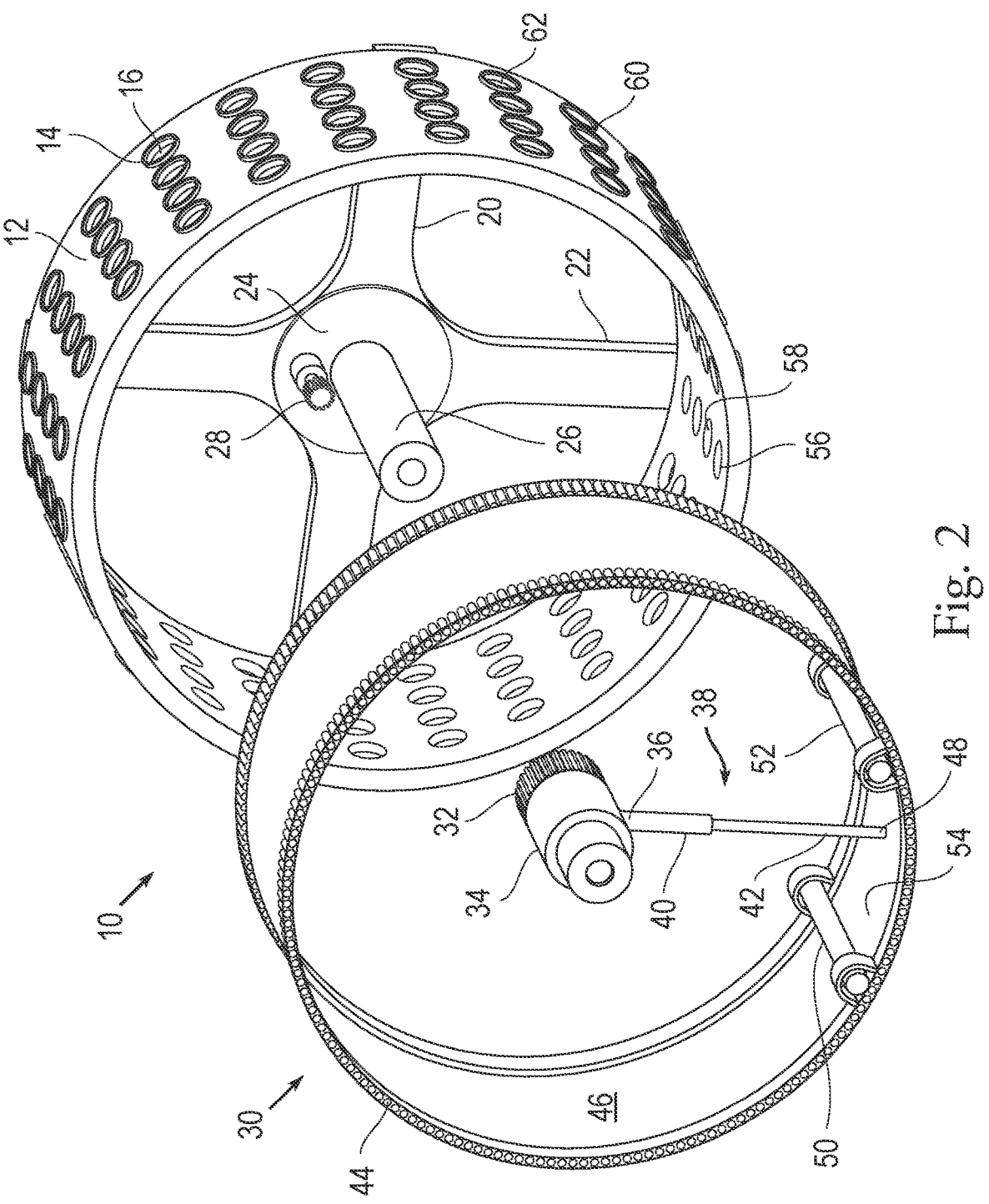
FIG. 2 is a top front side perspective view of the wheel of FIG. 1 with parts separated.
Figure 3:
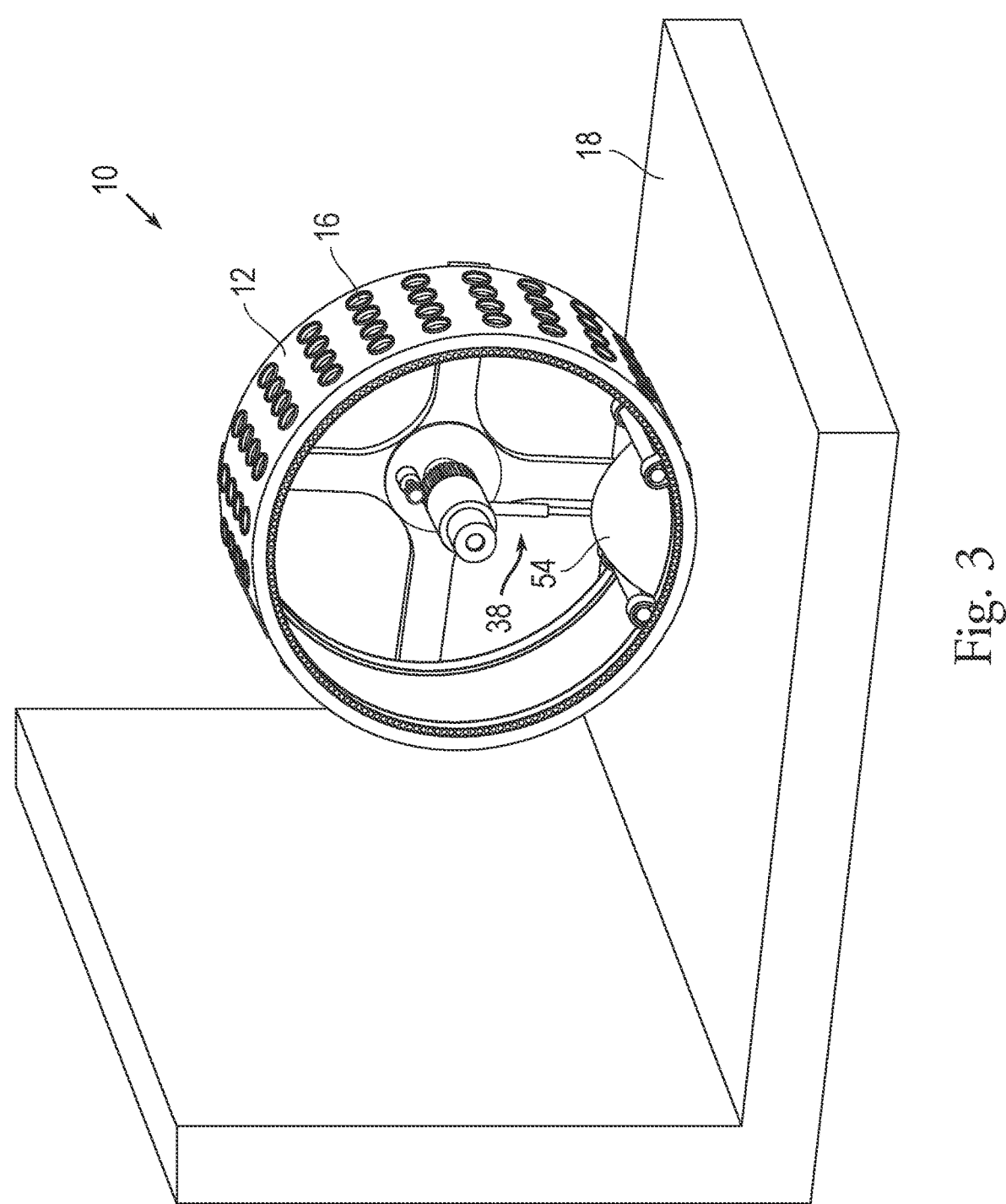
FIG. 3 is a top front side perspective view of the wheel of FIG. 1 with a diaphragm expanded using a linear actuator.
Figure 4:
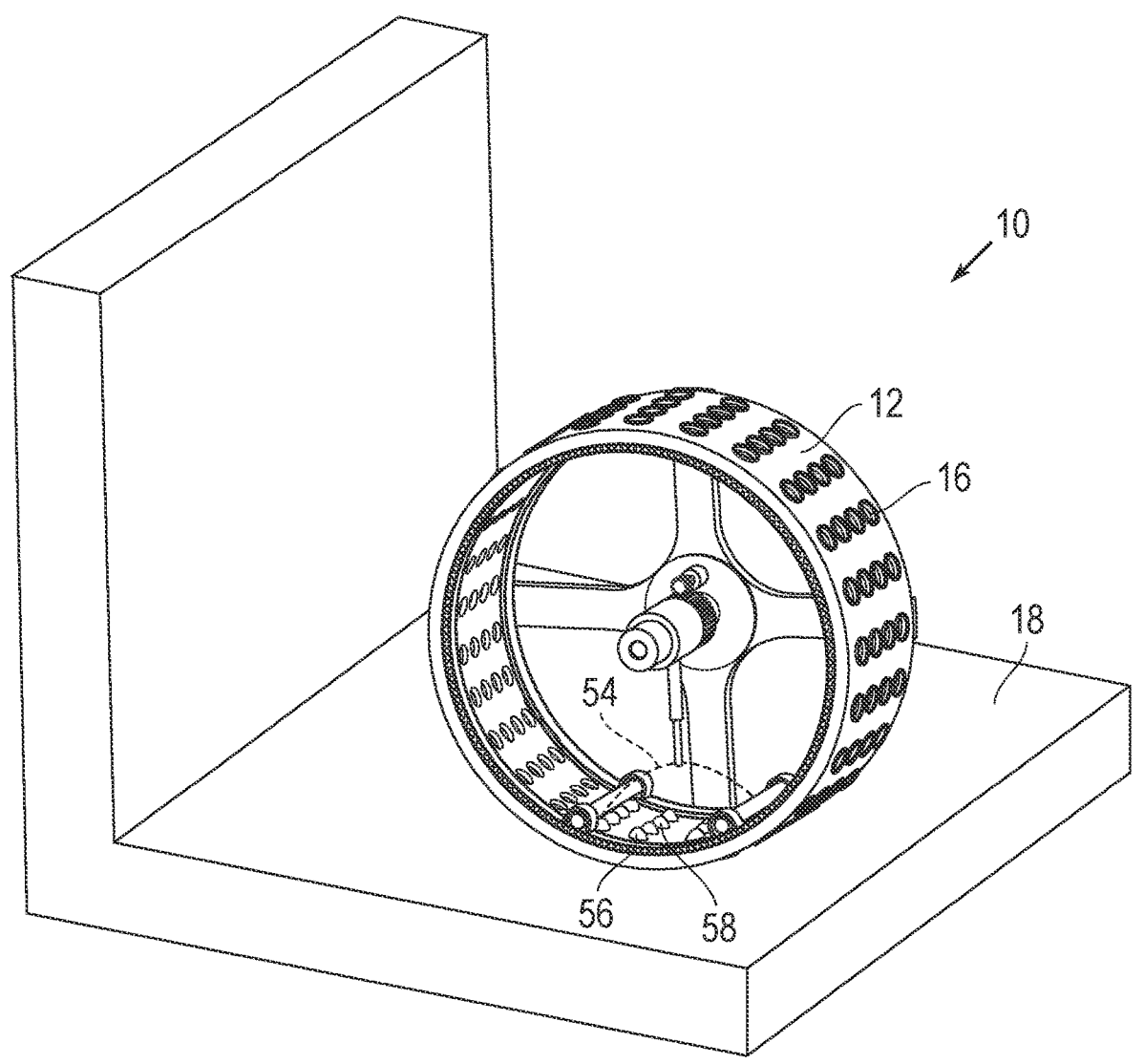
FIG. 4 is a top front side perspective view of the wheel of FIG. 3 illustrating the effect of the expanded diaphragm on suction cups.

Referring to FIGS. 1-2, the outer ring 12 has brackets 20, 22 extending from a central region 24 having an axle 26 and a motor driving gear 28. An inner ring 30 has an inner gear 32 on a sleeve bearing 34, to which is connected at one end 36 of a linear actuator 38. The linear actuator 38 can be a telescoping pair of rods 40, 42. The inner gear 32 engages the motor driving gear 28 to rotate the inner ring 30 on roller bearings 44 within the inner periphery of the outer ring 12. The inner ring 30 has a diaphragm 46 coupled to the other end 48 of the linear actuator 38. A pair of diaphragm holding bars 50, 52 are disposed on either side of a portion 54 of the diaphragm 46. When the telescoping pair of rods 40, 42 of the linear actuator 38 operate to have the lower rod 42 extend into the upper rod 40, the linear actuator 38 pulls and lifts the portion 54 of the diaphragm 46 away from the stretchable material 56, 58 below the portion 54. The portion 54 then balloons and lifts the stretchable material 56, 58 upwards by a vacuum effect. Therefore, in conjunction with the linear action of the rod 42 of the linear actuator 38 and the lifted stretchable material 56, 58, a suction effect occurs at the location of the outer ring 12 adjacent to the surface 18 below the location of the lifted stretchable material 56, 58. Accordingly, the wheel 10 adheres to the surface 18 of a structure.

In order to adhere the wheel 10 to the surface 18, the linear actuator 38 is controlled by code stored in a memory and executing in a hardware processor to move the rod 42 away from the surface 18, and so to lift and balloon the portion 54 of the diaphragm 46. Alternatively, the linear actuator 38 is electrically operated, and is independent of the motor driving gear 28. The motor driving gear 28 operates to keep the wheel inner ring 30 and the linear actuator 38, which is mounted rigidly on the inner ring 30, perpendicular to the surface 18 in order to create the adhesion. The center motor driving gear 28 and the linear actuator 38 are parts of the inner ring 30 and coupled together.

In a further alternative embodiment, the actuator 38 is controlled to extend or retract the rod 42 by a gear assembly connected to the motor driving gear 28 such that rotation of the wheel 10 causes the rod 42 to move towards the longitudinal axis, causing the adhesion of the wheel 10 to the surface 18, and ceasing of the rotation of the wheel 10 causes the rod 42 to move away from the longitudinal axis, which reduces or eliminates the adhesion of the wheel 10 to the surface 18.

When the portion 54 of the diaphragm 46 is lifted, a vacuum is created between the portion 54 and the stretchable material 56, 58. The stretchable material 56, 58 deforms to create the suction effect and adhesion of the wheel 10 to the surface 18. To release the wheel 10 from the surface 18, such as when a crawler having the wheel 10 disengages from the surface 18, the code executing in the hardware processor moves the rod 42 towards the surface 18. Such movement of the rod 42 removes the biasing force of the rod 42 from the portion 54 of the diaphragm 46, which restores the diaphragm 46 to the unstretched configuration. In turn, the vacuum between the portion 54 of the diaphragm 46 and the stretchable materials 56, 58 is reduced or ceases, which restores the stretchable materials 56, 58 to the undeformed state. Therefore, the suction effect is reduced or eliminated, and so the adhesion between the wheel 10 and the surface 18 is reduced or eliminated, allowing the wheel 10 to disengage from the surface 18.

It is to be understood that the suction effect is not limited to providing adhesion between the wheel 12 and a non-metallic surface 18. In addition, the suction effect can provide adhesion between the wheel 12 and a metallic surface, or between the wheel 12 and a hybrid surface composed of portions of both non-metallic material and metallic material.

During rotation of the wheel 10, including the outer ring 12, adjacent to the surface 18, the linear actuator 38 can stay substantially perpendicular to the portion of the surface 18 being traversed. As the wheel 10 rotates, the suction effect of the stretchable material 56, 58 reduces or ceases with contacting portion of the surface 18 as the stretchable material 56, 58 moves away from the contacting portion of the surface 18. However, since the linear actuator 38 remains substantially perpendicular to the portion of the surface 18 being traversed, additional stretchable material 60, 62 arrives under the ballooned portion 54 of the diaphragm 46, so that such stretchable material 60, 62 generates a suction effect with the portion of the surface 18 being traversed. Accordingly, during actuation of the linear actuator 38, the portion 54 of the diaphragm maintains a continuous suction effect between the surface 18 and the wheel 10, and so the wheel 10 adheres to the surface 18 in any orientation.

Figure 5:
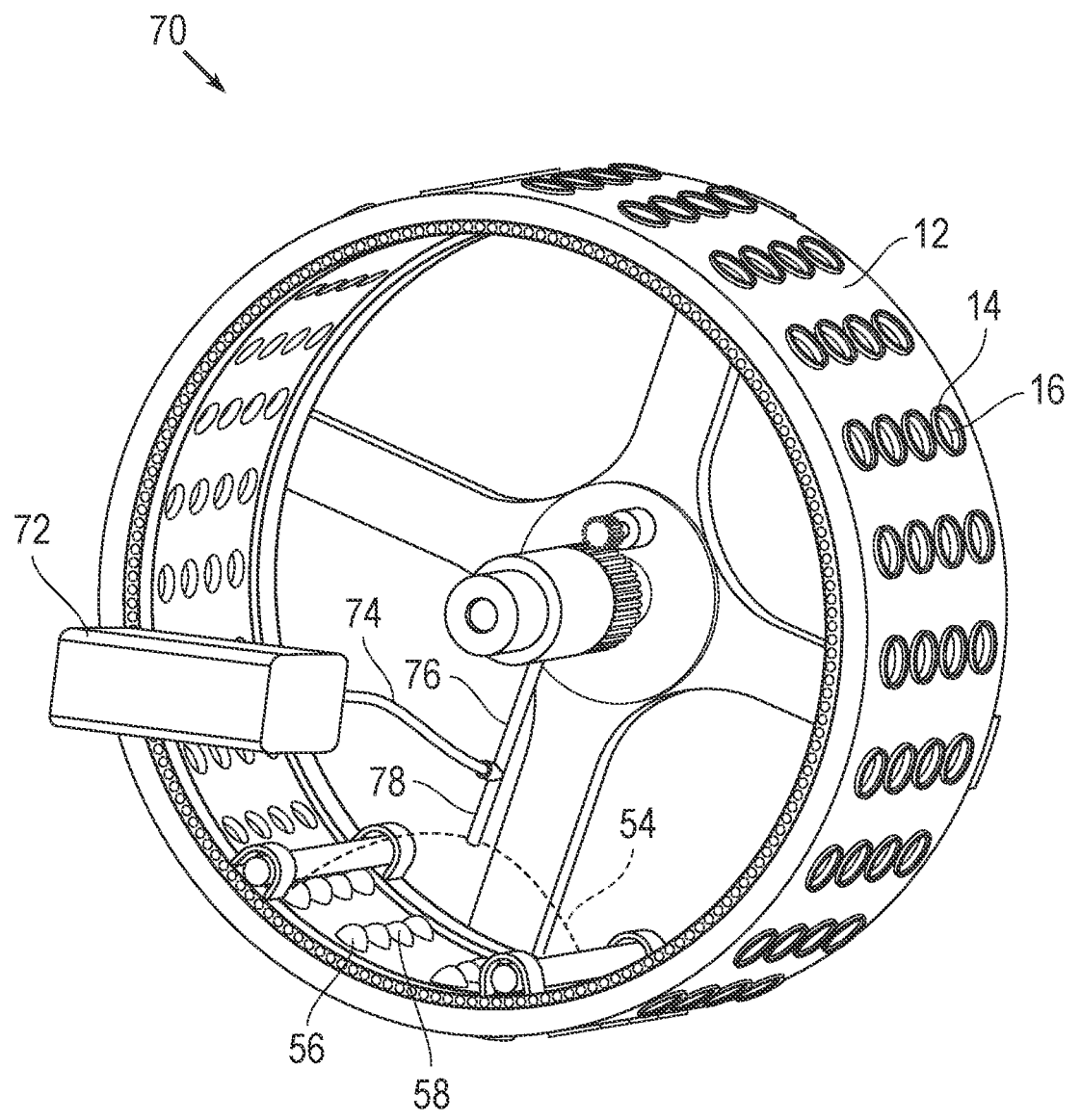
FIG. 5 is a top front side perspective view of an alternative embodiment of the wheel with a pump.

In an alternative embodiment shown in FIG. 5, a wheel 70 has a compressor or pump 72 connected by a tubular line 74 to a tube 76 connected at one end 78 to the portion 54 of the diaphragm 46. The pump 72 can be a pneumatic pump. The pump 72 moves gases, such as air, or liquids into or out of the tubular line 74 and the tube 76. By controlling the flow of gases or liquids, the pump 72 can maintain a negative pressure on the portion 54 of the diaphragm 46 to balloon the portion 54. In addition, by controlling the flow of gases or liquids, the pump 72 can maintain zero or positive pressure on the portion 54 to restore the portion 54 of the diaphragm 46 to the unstretched state.

In order to adhere the wheel 70 to the surface 18, the pump 72 is controlled by code stored in a memory and executing in a hardware processor to establish a negative pressure or a vacuum on the portion 54 of the diaphragm 46, and so to lift and balloon the portion 54 of the diaphragm 46. Alternatively, the tube 76 can be replaced by a linear actuator. The pump 72 can be utilized to operate the linear actuator movement. The pump 72 is directly withdrawing or supplies air, another gas, or a liquid to the inside of the linear actuator to provide linear movement which causes suction to the balloon diaphragm 46 and cause adhesion. The pump 72 is not mechanically coupled to the motor driving gear 28.

In a further alternative embodiment, the pump 72 is controlled to be turned on or off by a gear assembly connected to the motor driving gear 28 such that rotation of the wheel 10 causes the pump 72 to establish the negative pressure, and so increasing the adhesion of the wheel 10 to the surface 18. The ceasing of the rotation of the wheel 10 causes the pump 72 to establish the positive or zero pressure, which reduces or eliminates the adhesion of the wheel 10 to the surface 18.

When the portion 54 of the diaphragm 46 is lifted, a vacuum is created between the portion 54 and the stretchable material 56, 58. The stretchable material 56, 58 deforms to create the suction effect and adhesion of the wheel 70 to the surface 18. To release the wheel 70 from the surface 18, such as when a crawler having the wheel 70 disengages from the surface 18, the code executing in the hardware processor establishes a zero or positive pressure on the portion 54 of the diaphragm 46, which removes the biasing force of the vacuum or negative pressure from the portion 54 of the diaphragm 46, which restores the diaphragm 46 to the unstretched configuration. In turn, the vacuum between the portion 54 of the diaphragm 46 and the stretchable materials 56, 58 is reduced or ceases, which restores the stretchable materials 56, 58 to the undeformed state. Therefore, the suction effect is reduced or eliminated, and so the adhesion between the wheel 70 and the surface 18 is reduced or eliminated, allowing the wheel 70 to disengage from the surface 18.

Figure 6:
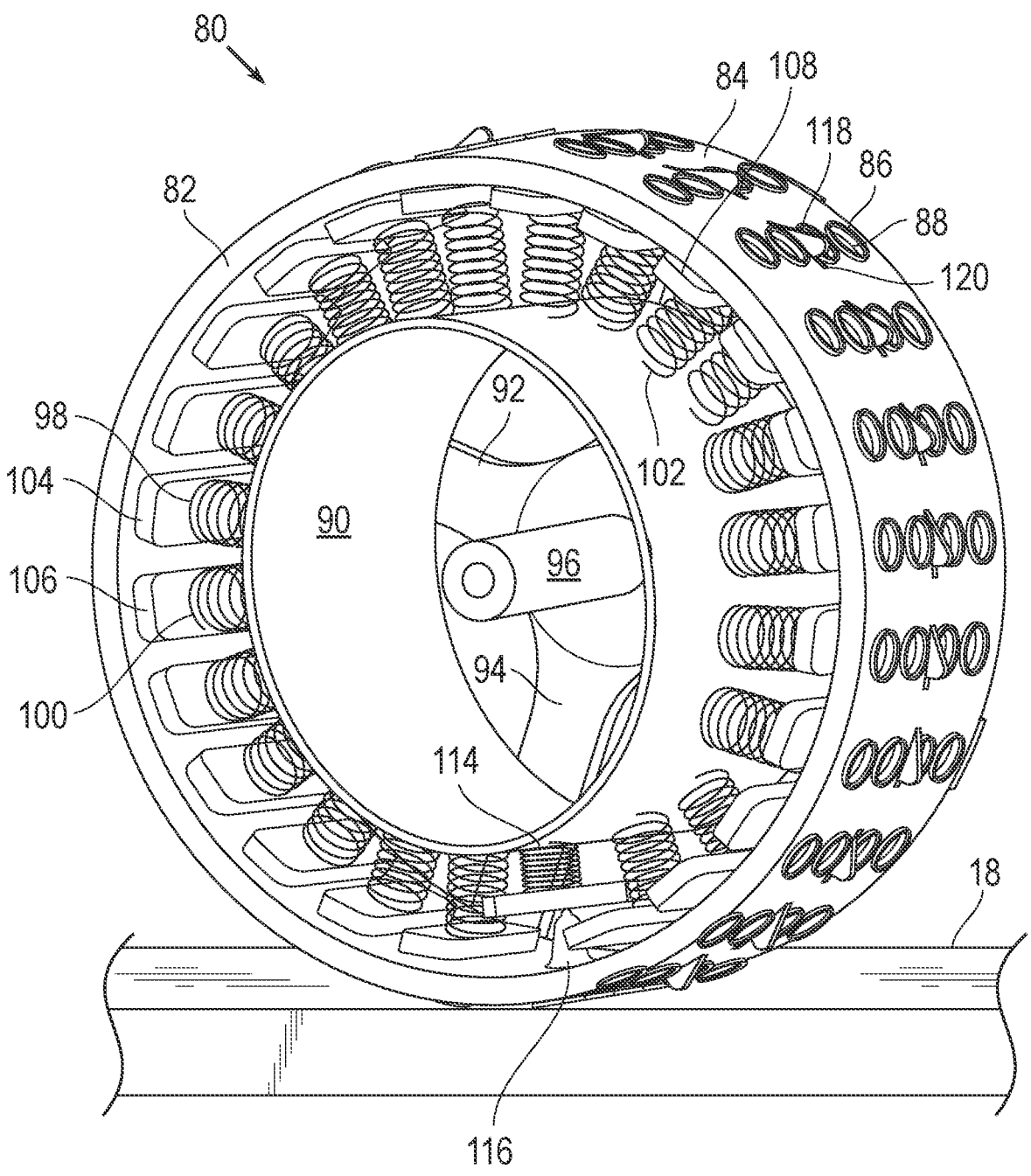
FIG. 6 is a top front side perspective cut-away view of another alternative embodiment of the wheel with springs for actuating segments to expand suction cups.

In another alternative embodiment shown in FIGS. 6-11, a wheel 80 has an outer ring 82 having an outer circumferential surface 84 with apertures 86 therethrough. A stretchable material 88 is disposed in the apertures 86 which act as suction cups, as described in greater detail below. An inner sleeve 90 is coupled to the outer ring 82 by the brackets 92, 94 from which an axle 96 extends. A plurality of springs 98, 100, 102 bias a plurality of bars 104, 106, 108, respectively, inward towards the longitudinal axis of the wheel 80 coincident with the axle 96. As shown in FIG. 6, the springs 98, 100, 102 are elongated and in a state of tension due to interaction between a respective bar 104, 106, 108 and wedges and latching mechanisms as shown in FIG. 7-12, as described in greater detail below. However, the spring 114 in FIG. 6 is in its non-tension state with a stretchable material 116 pulled to create a suction effect on the surface 18 adjacent to the wheel 80 at the location of the stretchable material 116. Accordingly, the wheel 80 has adhesion to the surface 18 at the location of the stretchable material 116.

Figure 7:
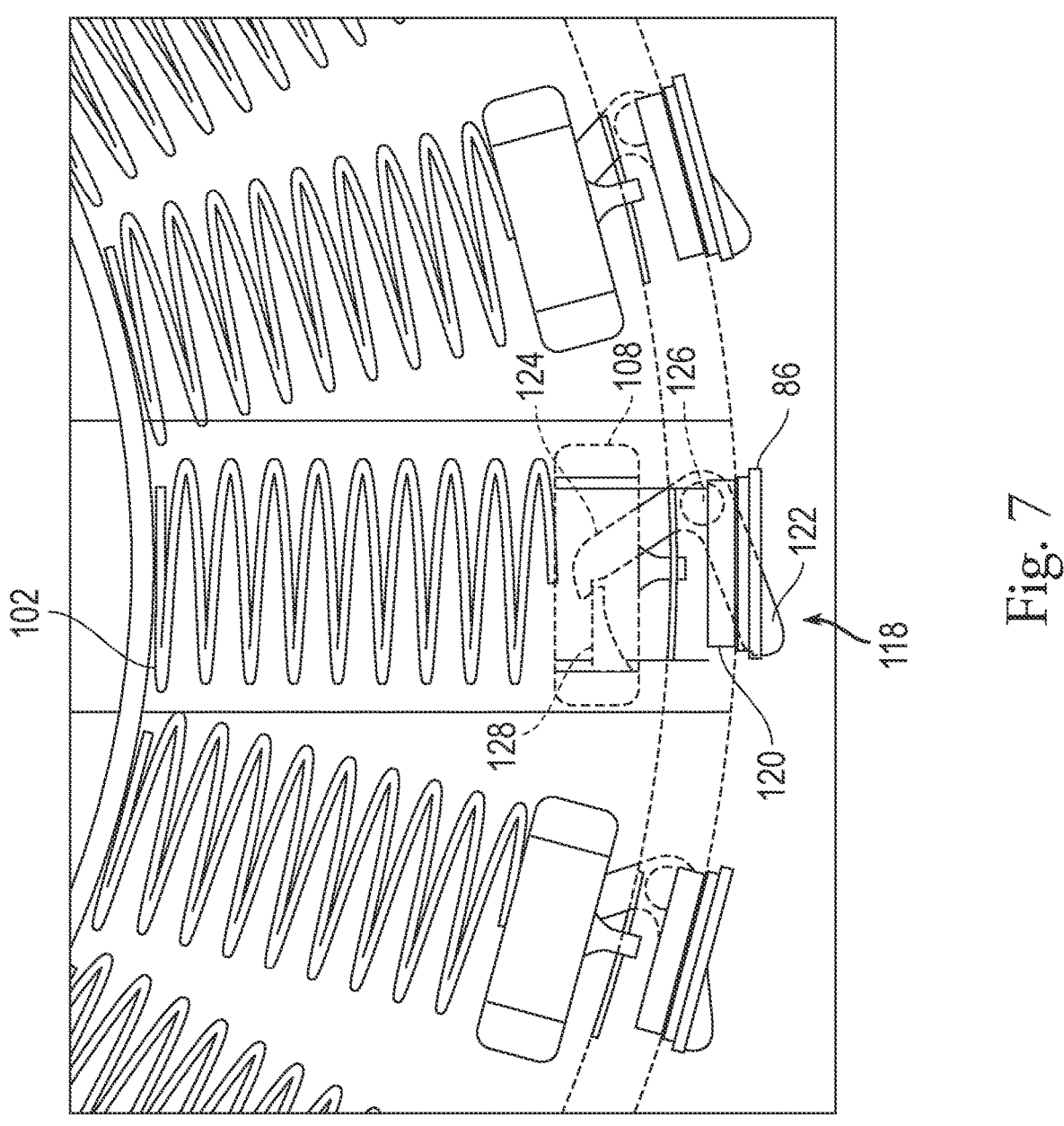
FIG. 7 is a cross-sectional view of the wheel of FIG. 6 with an activator switch not actuated.

As shown in FIG. 6, an activator switch 118 extends through a slot 120 in the outer circumferential surface 84. As the wheel 80 rotates to traverse the surface 18, when a given activator switch 118 is adjacent to the surface 18, pressure from the surface 18 moves the activator switch 118 into the slot 120 and activates a latching mechanism associated with the activator switch 118 and adjacent stretchable materials. Referring to FIG. 7, the activator switch 118 extends out of

Figure 8:
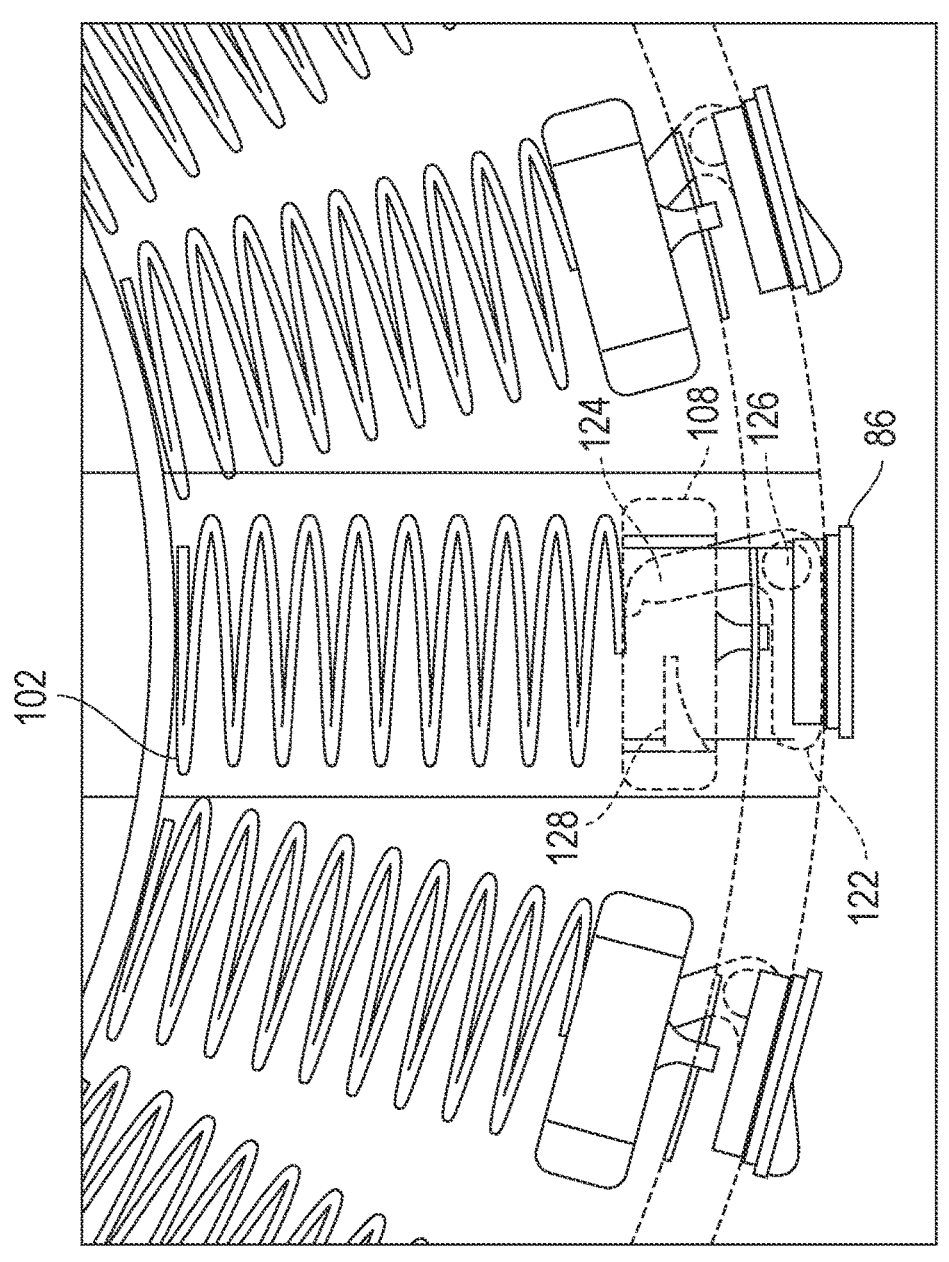
FIG. 8 is a cross-sectional view of the wheel of FIG. 6 with the activator switch being actuated.

7 the slot 120. The activator switch 118 has a pair of arms 122, 124 extending from a pivot 126. An end of the arm 122 extends out of the slot 120 and engages the surface 18 as the wheel 80 rotates. An end of the arm 124 engages a latch member 128. When the surface pushes the end of the arm 122 into the slot 120, the activator switch 118 rotates about the pivot 126, and moves the end of the arm 124 away from the latch member 128, as shown in FIG. 8.

Figure 9:
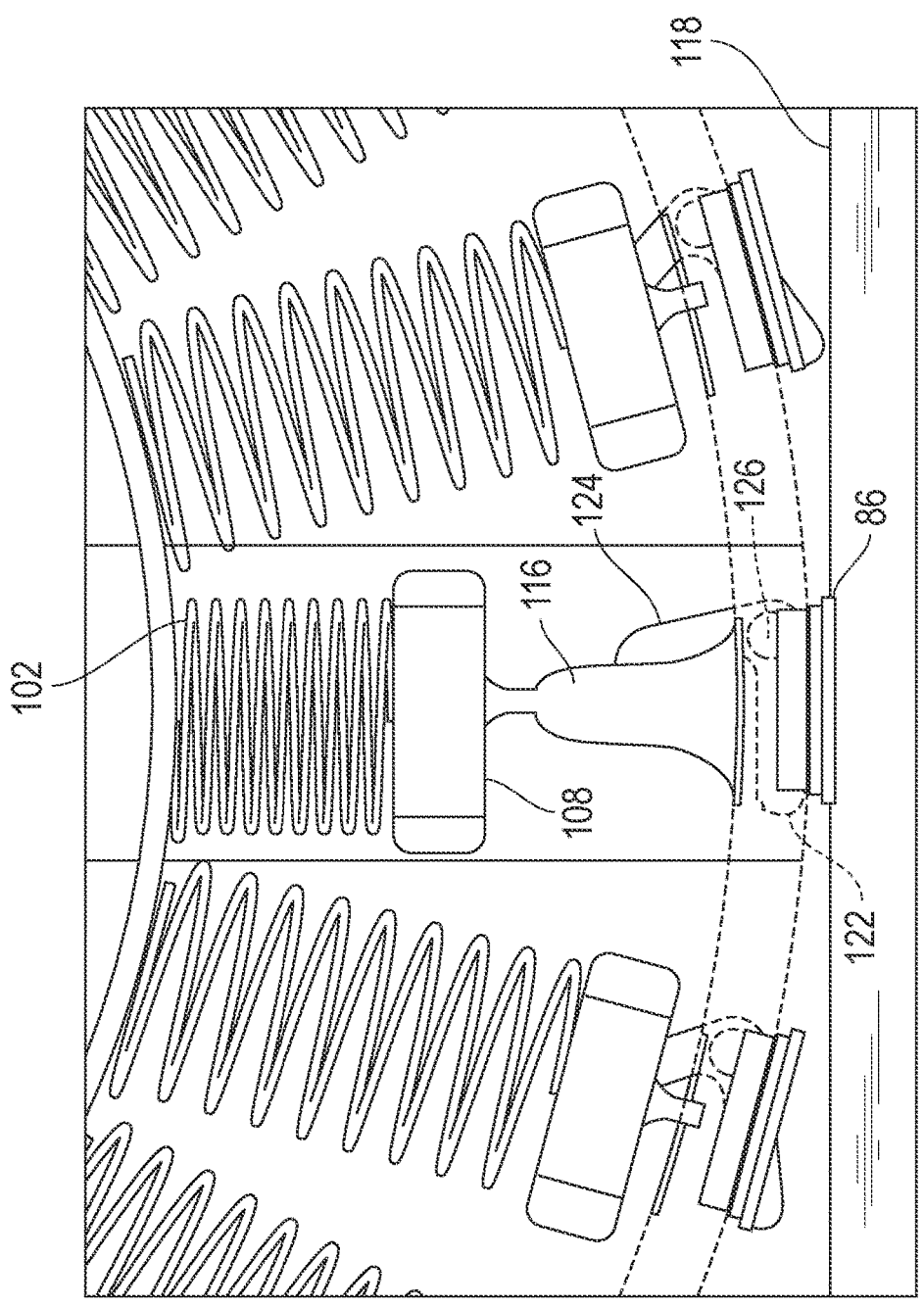
FIG. 9 is a cross-sectional view of the wheel of FIG. 6 with the activator switch being further actuated to expand suction cups.

With the arm 124 pivoted away from the latch member 128, the spring 102 returns to the non-tensioned state by the restorative force of the spring 102, as shown in FIG. 9. Such a restorative force causes the spring 102 to pull the bar 108 and the associated stretchable material 116 inward towards the longitudinal axis. The pulled stretchable material 116 creates a suction effect on the location of the surface 18 adjacent to the stretchable material 116. Thus, the pulled stretchable material 116 acts as a suction cup configured to create adhesion between the wheel 80 and the adjacent location on the surface 18.

Figure 10:
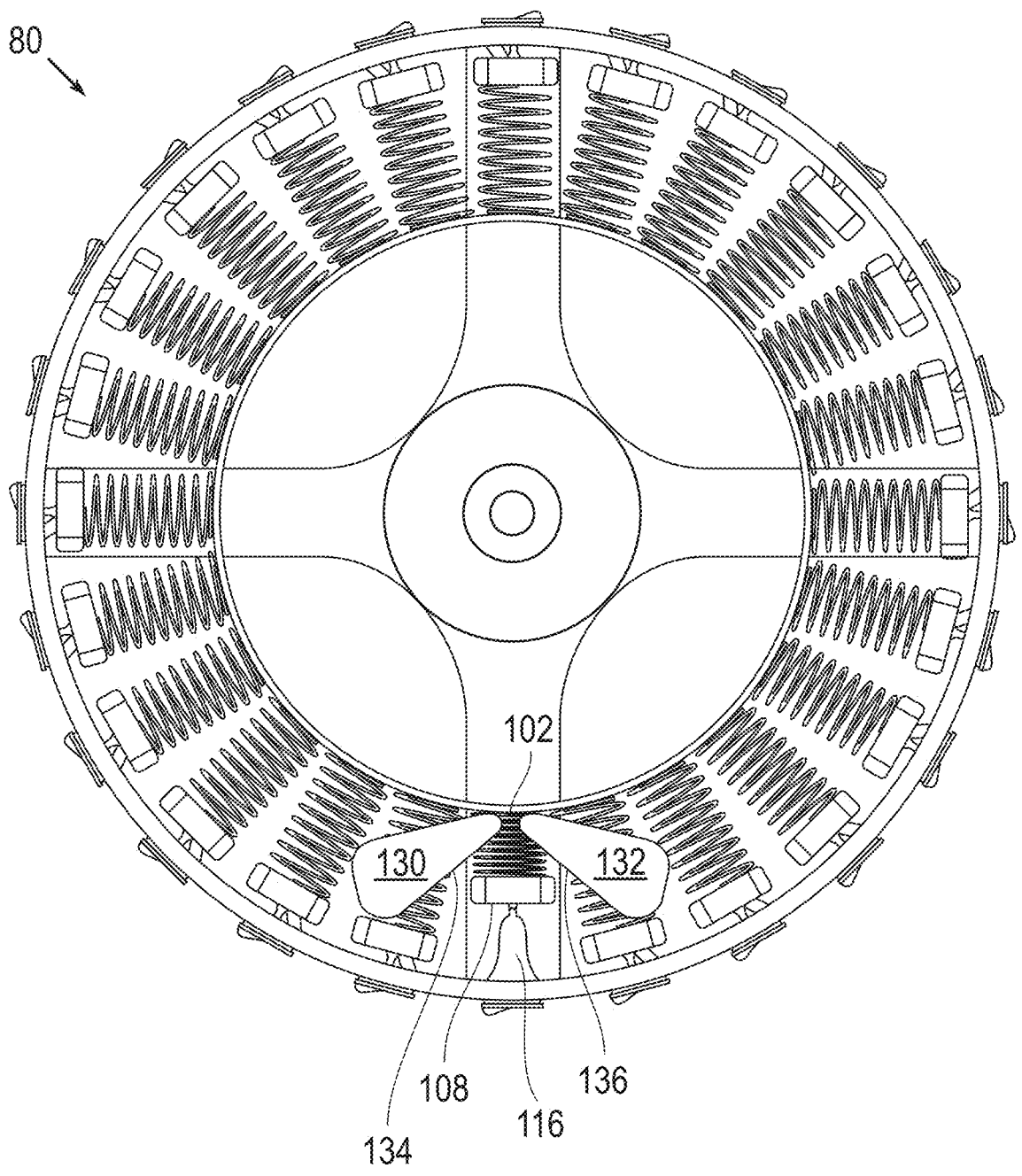
FIG. 10 is a front view of the wheel of FIG. 6 with springs and wedges.
Figure 11:
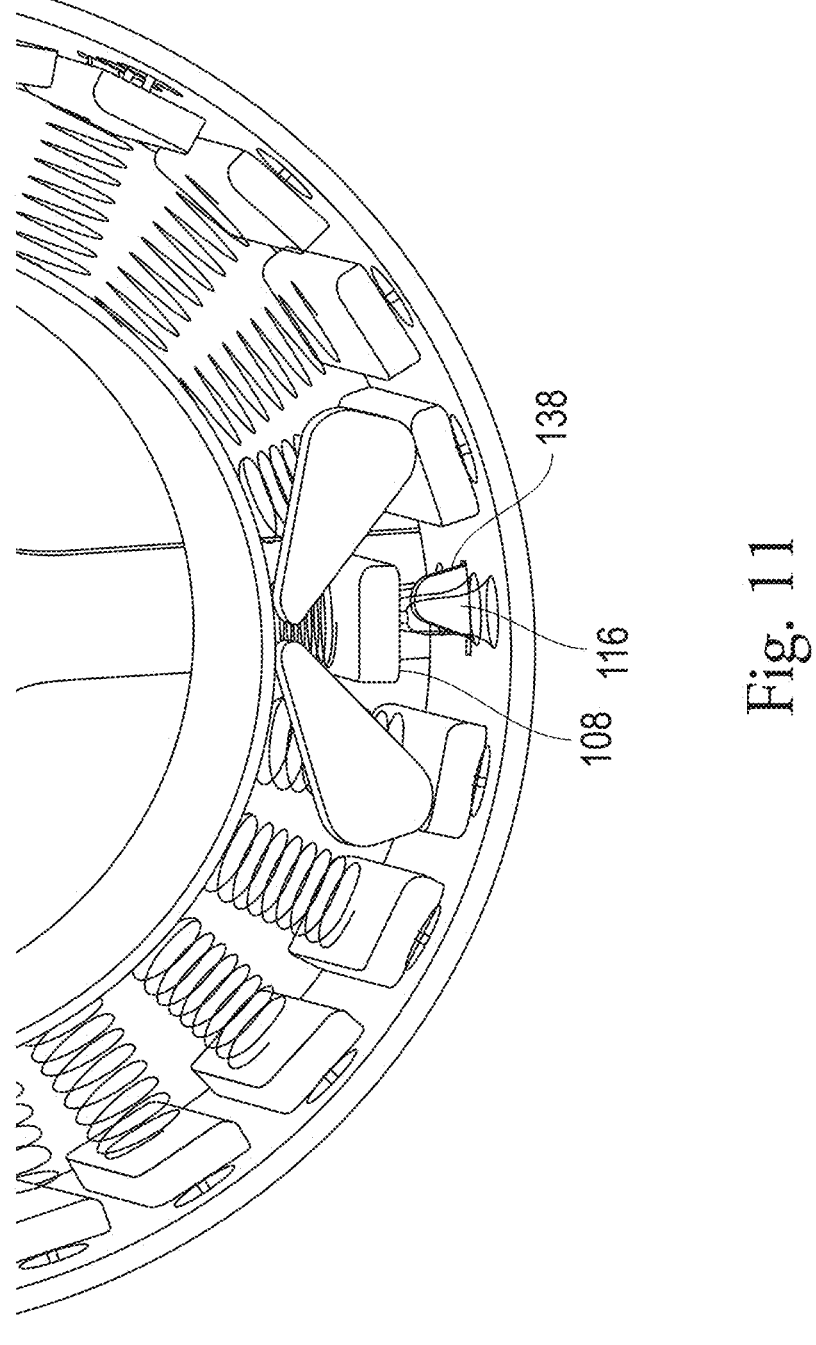
FIG. 11 is a top front perspective view of the wheel of FIG. 6.
Figure 12:
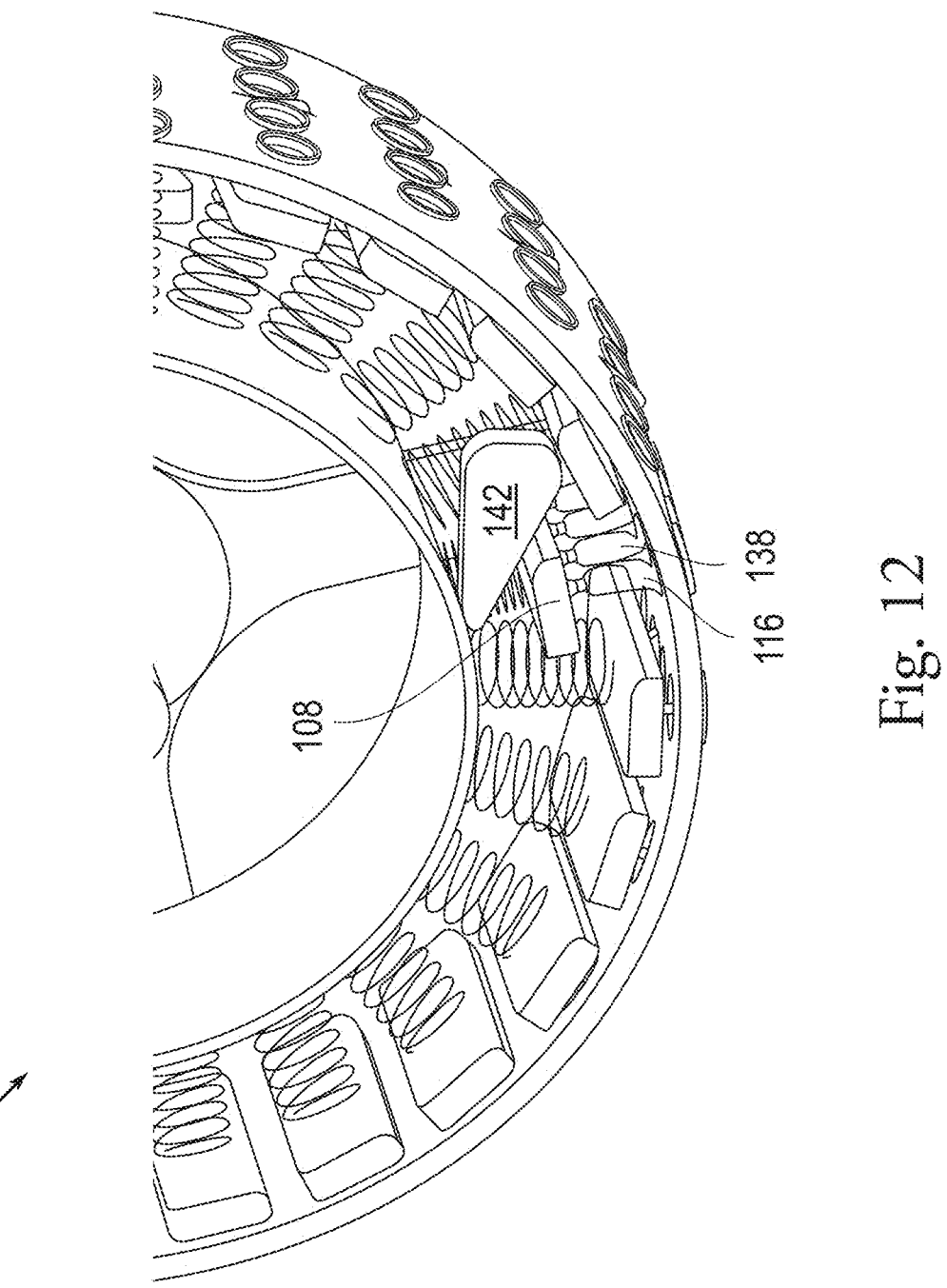
FIG. 12 is a front view of an alternative embodiment of the wheel with a single wedge.

As shown in FIGS. 10-11, the wheel 80 also includes a pair of stationary wedges 130, 132 on either side of the bar 108 which is adjacent to the surface 18. As the wheel 80 rotates, the inclined sides of the wedges 130, 132 act to reset the latching mechanism associated with the bar 108 and re-tension the spring 102 in the elongated configuration, as shown in FIG. 7. Referring to FIGS. 7-9 in conjunction with FIGS. 10-11, as the wheel 80 rotates, for example, clockwise relative to the front view in FIGS. 10-11, the arm 124 pivots away from the latch member 128 as described above, and a left side of the bar 108 slides up the inclined surface 134 as the spring 102 moves to its non-tensioned state. The pulled stretchable material 116 creates a suction effect on the location of the surface 18 adjacent to the stretchable material 116. Thus, the pulled stretchable material 116 acts as a suction cup configured to create adhesion between the wheel 80 and the adjacent location on the surface 18.

As the wheel 80 further rotates clockwise, the right side of the bar 108 slides down the inclined surface 136 as the spring 102 moves to a tensioned state. The arm 124 pivots towards the latch member 128 while the activator switch 118 extends its arm 122 out of the slot 120. When the activator switch 118 is pressed against the surface 18, the activator switch 118 unleashes the bar 108 which leads to expanding the stretchable material 116, creating suction and adhesion to the surface 18. Alternatively, the activator switch 118 can have a resilient member, such as a leaf spring, which biases the activator switch 118 to extend out of the slot 120 when the surface 18 no longer applies pressure to the arm 122 of the activator switch 118. The activator switch 118 is extended out of the slot 120 and hinged around the pivot 126.

Accordingly, the stretchable material 116 is no longer pulled, and so the suction effect on the location of the surface 18 adjacent to the stretchable material 116 is reduced or eliminated. Thus, the stretchable material 116 no longer acts as a suction cup, and the adhesion between the wheel 80 and the adjacent location on the surface 18 is reduced or eliminated.

As shown in FIGS. 6 and 11, the wheel 80 can have multiple stretchable materials disposed in multiple apertures arranged in rows which are commonly controlled by a single associated bar, such as the bar 108 and the materials 116, 138 shown in FIG. 11. Such multiple stretchable materials provide increased suction effects and greater adhesion of the wheel 80 to a surface 18. In a further alternative embodiment, shown in FIG. 12, the wheel 140 can have a single stationary wedge 142 configured to reset the latching mechanism associated with the bar 108 and an activator switch.

In another embodiment, a method includes providing a wheel with an axle and an outer circumferential surface having a plurality of apertures and a plurality of stretchable materials. Each aperture has a respective stretchable material therein. The method further includes rotating the wheel to move a first stretchable material adjacent to a surface of a structure, and moving a portion of the first stretchable material in the direction radial to the axle, thereby controlling adhesion of a portion of the outer circumferential surface to the surface of the structure. The surface of the structure is non-metallic or metallic. The portion of the first stretchable material can be moved by a linear actuator controlled by code stored in a memory and executing in a hardware processor to move a telescoping rod away from the surface, and so to lift and balloon the portion of the first stretchable material. Alternatively, the linear actuator can be electrically operated, and is independent of a motor driving gear rotating the wheel. The motor driving gear can operate to keep a wheel inner ring and the linear actuator, which is mounted rigidly on the inner ring, perpendicular to the surface in order to create the adhesion. The center motor driving gear and the linear actuator can be parts of the inner ring and coupled together.

In another embodiment, a pump can be utilized to operate the portion of the first stretchable material. The pump can control movement of a linear actuator. The pump is directly withdrawing or supplies air, another gas, or a liquid to the inside of the linear actuator to provide linear movement which causes suction to the balloon diaphragm and cause adhesion. The pump can be independent and not mechanically coupled to a motor driving gear. In a further alternative embodiment, the pump is controlled to be turned on or off by a gear assembly connected to the motor driving gear such that rotation of the wheel causes the pump to establish the negative pressure, and so increasing the adhesion of the wheel to the surface. The ceasing of the rotation of the wheel causes the pump to establish the positive or zero pressure, which reduces or eliminates the adhesion of the wheel to the surface.

In a further alternative embodiment, the portion of the first stretchable material can be controlled by a bar attached to a spring. An activator switch extends out of the wheel. When the activator switch is pressed against the surface, the activator switch unleashes the bar which leads to expanding the stretchable material, creating suction and adhesion to the surface. Alternatively, the activator switch can have a resilient member, such as a leaf spring, which biases the activator switch to extend out of a slot when the surface no longer applies pressure to the arm of the activator switch. The activator switch is extended out of the slot and hinged around a pivot.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on parallel hardware processors or serial hardware processors such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including." "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A wheel, comprising:
an axle;
an outer circumferential surface having a plurality of apertures and a plurality of stretchable materials, wherein each aperture has a respective stretchable material therein, wherein a portion of the outer circumferential surface is adjacent to a surface of a structure;

a bracket coupling the outer circumferential surface to the axle;
a portion of a diaphragm adjacent to the portion of the outer circumferential surface; and
a diaphragm moving device configured to move the portion of the diaphragm in a direction radial to the axle,
wherein a first aperture of the plurality of apertures and a respective first stretchable material of the plurality of stretchable materials are adjacent to the surface of the structure, and
wherein the moved portion of the diaphragm moves a portion of the first stretchable material in the direction radial to the axle, thereby controlling adhesion of the portion of the outer circumferential surface to the surface of the structure.

2. The wheel of claim 1, wherein movement of the portion of the first stretchable material radially towards the axle increases adhesion of the portion of the outer circumferential surface to the surface of the structure.

3. The wheel of claim 1, wherein movement of the portion of the first stretchable material radially away from the axle decreases adhesion of the portion of the outer circumferential surface to the surface of the structure.

4. The wheel of claim 1, wherein the diaphragm moving device is a linear actuator.

5. The wheel of claim 4, wherein the linear actuator has a rod coupled to the portion of the diaphragm, and
wherein the rod moves in the direction radial to the axle to move the portion of the diaphragm in the direction radial to the axle.

6. The wheel of claim 5, further comprising:
a motor driving gear configured to rotate or to not rotate the outer circumferential surface,
wherein the linear actuator is coupled to the motor driving gear by a gear assembly, and
wherein gear assembly moves the rod in the direction radial to the axle to move the portion of the diaphragm in the direction radial to the axle.

7. The wheel of claim 1, wherein the diaphragm moving device is a pump.

8. The wheel of claim 7, wherein the pump has a tube coupled to the portion of the diaphragm,
wherein the pump moves a substance in the direction radial to the axle to move the portion of the diaphragm in the direction radial to the axle, and
wherein the substance is a gas or a liquid.

9. The wheel of claim 8, further comprising:
a motor driving gear configured to rotate or to not rotate the outer circumferential surface,
wherein the pump is coupled to the motor driving gear by a gear assembly, and
wherein gear assembly controls the pump to move the substance in the direction radial to the axle to move the portion of the diaphragm in the direction radial to the axle.

10. The wheel of claim 1, wherein the surface of the structure is composed of a non-metallic material.

11. The wheel of claim 1, wherein the surface of the structure is composed of a metallic material.

12. A method, comprising:
providing a wheel with an axle and an outer circumferential surface having a plurality of apertures and a plurality of stretchable materials, wherein each aperture has a respective stretchable material therein;
rotating the wheel to move a first stretchable material adjacent to a surface of a structure; and moving a portion of the first stretchable material in the direction radial to the axle, thereby controlling adhesion of a portion of the outer circumferential surface to the surface of the structure.

13. The method of claim 12, wherein the surface of the structure is non-metallic or metallic.

5

* * * * *